United States Patent [19]
Hammond et al.

[11] Patent Number: 5,738,368
[45] Date of Patent: Apr. 14, 1998

[54] RESTRAINT SYSTEM FOR REAR SEAT OCCUPANT

[75] Inventors: Kimberly Jean Hammond, Troy; Timothy Wayne Hill, Sterling Heights; Brian Hugh Frantz, Royal Oak, all of Mich.; Gert Hans Erik Nilson, Wuppertal, Germany

[73] Assignee: General Motors Corporation, Detroit, Mich.

[21] Appl. No.: 704,958

[22] Filed: Aug. 29, 1996

[51] Int. Cl.⁶ ................................. B60R 21/22
[52] U.S. Cl. ................................. 280/730.1
[58] Field of Search ............... 280/730.1, 730.2, 280/732

[56] References Cited

U.S. PATENT DOCUMENTS

| | | | |
|---|---|---|---|
| 2,834,606 | 5/1958 | Bertrand | 280/730.1 |
| 3,370,886 | 2/1968 | Frost | 280/730.1 |
| 3,603,535 | 9/1971 | DePolo | 280/730.1 |
| 3,779,577 | 12/1973 | Wilfert | 280/730.1 |
| 3,927,901 | 12/1975 | Weman | 280/730.1 |
| 3,985,374 | 10/1976 | Powaska | 280/730.1 |
| 4,966,388 | 10/1990 | Warner et al. | 280/730.2 |
| 5,324,071 | 6/1994 | Gotomyo et al. | 280/730.1 |
| 5,344,184 | 9/1994 | Keeler et al. | 280/730.1 |
| 5,385,366 | 1/1995 | Frank et al. | 280/728.3 |
| 5,435,594 | 7/1995 | Gille | 280/730.1 |
| 5,458,367 | 10/1995 | Marts et al. | 280/730.1 |
| 5,472,230 | 12/1995 | Every, Sr. et al. | 280/730.1 |
| 5,482,230 | 1/1996 | Bird et al. | 280/730.1 |
| 5,492,359 | 2/1996 | Oliver | 244/121 |
| 5,547,149 | 8/1996 | Kalberer et al. | 280/730.1 |

*Primary Examiner*—Kenneth R. Rice
*Attorney, Agent, or Firm*—Kathryn A. Marra

[57] ABSTRACT

An air bag restraint system is used for restraining a rear seat occupant having an upper head portion and a lower knee portion. The restraint system includes a front seat including an upstanding seat frame and a reaction plate attached to the seat frame. An inflator is mounted on the reaction plate and the inflator discharges inflator gas. An air bag is mounted on the reaction plate and is in fluid communication with the inflator for receiving inflator gas therein to inflate the air bag. A deployment door is mounted rearward the reaction plate, inflator and air bag and is movably secured to the reaction plate and releasably secured to the seat. Advantageously, the deployment door also serves as a rearward trim panel for the seat.

22 Claims, 3 Drawing Sheets

RESTRAINT SYSTEM FOR REAR SEAT OCCUPANT

This invention relates to an air bag restraint system for protection of a rear seat occupant.

BACKGROUND OF THE INVENTION

It is well known in motor vehicles to provide an air bag module for protecting a vehicle occupant. It is also known to provide an air bag module including an inflatable restraint cushion and an inflator for generating gas to inflate the cushion upon sensing predetermined vehicle conditions. It is also known to provide air bag modules which protect front driver and front passenger seat occupants during frontal and side collisions.

The prior art has also suggested that an air bag module may be used for protection of a rear seat occupant in a frontal collision by mounting the air bag and inflator on the back of the front seat such that it deploys forward of the rear seat occupant. The typical prior art modules provide an air bag that is placed and shaped for restraining the: upper body and head of the rear seat occupant without restraining the lower body and knees of the occupant. In addition, the prior art modules are assembled inside the seat such that construction of the seat assembly can only be completed after prior insertion of the air bag module. Thus, the prior art modules are designed as a separate independent unit from the seat and packaging space must be developed within the existing seat for the module.

In addition, prior art modules are not easily replaceable and the entire seat must be replaced after a deployment. In addition, the air bag must typically tear apart the cushion and fabric material of the seat during deployment.

SUMMARY OF THE INVENTION

This invention provides advantages and alternatives over the prior art by providing an air bag restraint system which is designed to be an integral portion of the seat structure. The air bag module can be assembled independent of the seat assembly and then is easily attached to the seat assembly either during the seat assembly or as the final component to complete the seat assembly. Since the module is uniquely designed to incorporate and provide part of the seat structure, a single module having a single inflatable air bag can be used to provide protection for the both the head and knee portions of the rear seat occupant. Since the module is integrally designed with the seat, conventional tear seams which destroy the seat are eliminated.

These advantages are accomplished :in the present invention by providing an air bag restraint system for restraining a rear seat occupant having an upper head portion and a lower knee portion. The restraint system includes a front seat including an upstanding seat frame and a reaction plate attached to the seat frame. An inflator is mounted on the reaction plate and the inflator discharges inflator gas. An air bag is mounted on the reaction plate and is in fluid communication with the inflator for receiving inflator gas therein to inflate the air bag. A deployment door is mounted rearward the reaction plate, inflator and air bag and is movably secured to the reaction plate and releasably secured to the seat. Advantageously, the deployment door also serves as a rearward trim panel for the seat. Preferably, the deployment door includes a lower door portion pivotally secured to the seat and an upper door portion releasably secured to the seat, such as by hook and loop type fasteners. Also preferably, flexible straps extend between the reaction plate and the deployment door to limit rearward pivotal movement of the deployment door upon air bag inflation.

In accordance with another preferred aspect of the invention, the air bag includes a lower bag portion which substantially fills the volume between the reaction plate and the deployment door upon inflation. The air bag includes an upper bag portion which extends upwardly above the deployment door and rearwardly and laterally outward from the deployment door upon inflation. Thus, the inflated upper bag portion is positioned for protecting the upper head portion of the occupant the inflated lower bag portion and the deployment door cooperatively provide a knee restraint for protecting the knee portion of the occupant. Preferably, the upper bag portion of the air bag has a generally cylindrical cross-section and the lower bag portion of the air bag has a generally triangular-shaped cross-section. Also preferably, the air bag includes a forward face and a rearward face and the upper bag portion includes an internal tether extending between the forward face and the rearward face. The tether is positioned above the deployment door and limits rearward inflation of the upper bag portion of the air bag upon inflation.

Preferably, the front seat includes an upstanding seat frame including laterally spaced apart sides rails and a cushion portion including a rearwardly facing seat aperture. The air bag module is mounted within the seat aperture and the reaction plate is attached between the side rails of the seat frame. The deployment door is movably secured to the reaction plate and closes the rearwardly facing seat aperture when the module is assembled to the seat such that the deployment door is a rear trim panel for the seat. The deployment door has a lower door portion pivotally secured to the seat and an upper door portion releasably secured to the cushion portion when the module is assembled to the seat. For easy snap-fitted attachment of the module to the seat, one of the lower door portion and the seat includes a first latching member and the other of the lower door portion and the seat carries a second latching member and the first and second latching members engage upon attachment of the module to the front seat to pivotally attach the deployment door to the seat. One of the latching members may be a clip and the other a rod. In addition, the upper door portion is preferably easily attached to the upper portion of the seat by pressing together hook and loop fasteners.

Thus, this invention provides a restraint system for a rear seat occupant in certain frontal collisions which advantageously provides restraint for both the upper head portion and the lower knee portion of the occupant using a single module with a single inflator. In addition, the deployment door serves multiple purposes since it performs as a releasable deployment door, a knee bolster for protection of the knee portion, and as a decorative rear trim panel for the front seat. Advantageously, the restraint system is also easy to assemble and easy to service since it is an integral part of the front seat assembly.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
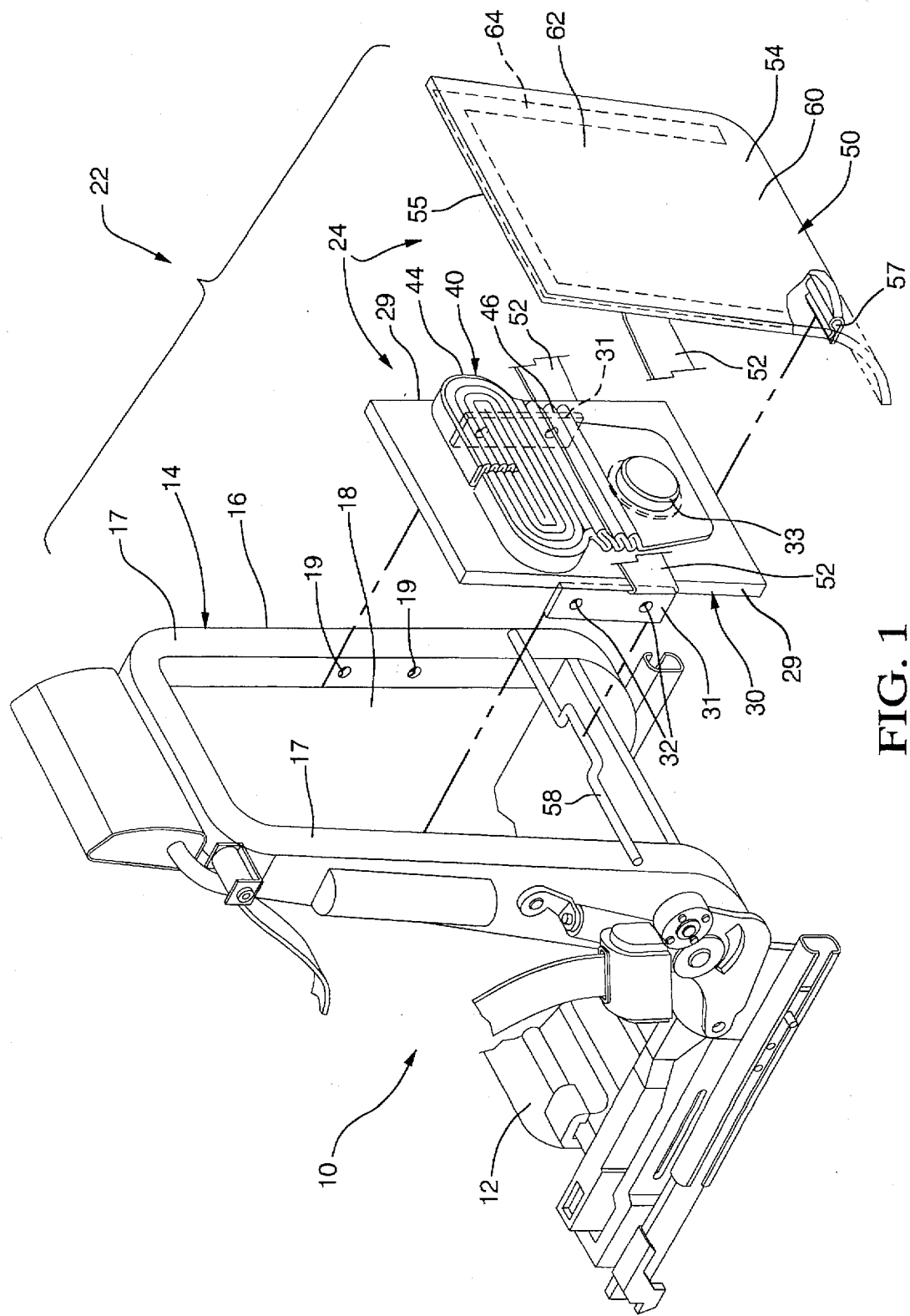
FIG. 1 is a perspective view of an air bag restraint system including a vehicle front seat and a partially exploded perspective view of an air bag module for attachment to the seat.
Figure 2:
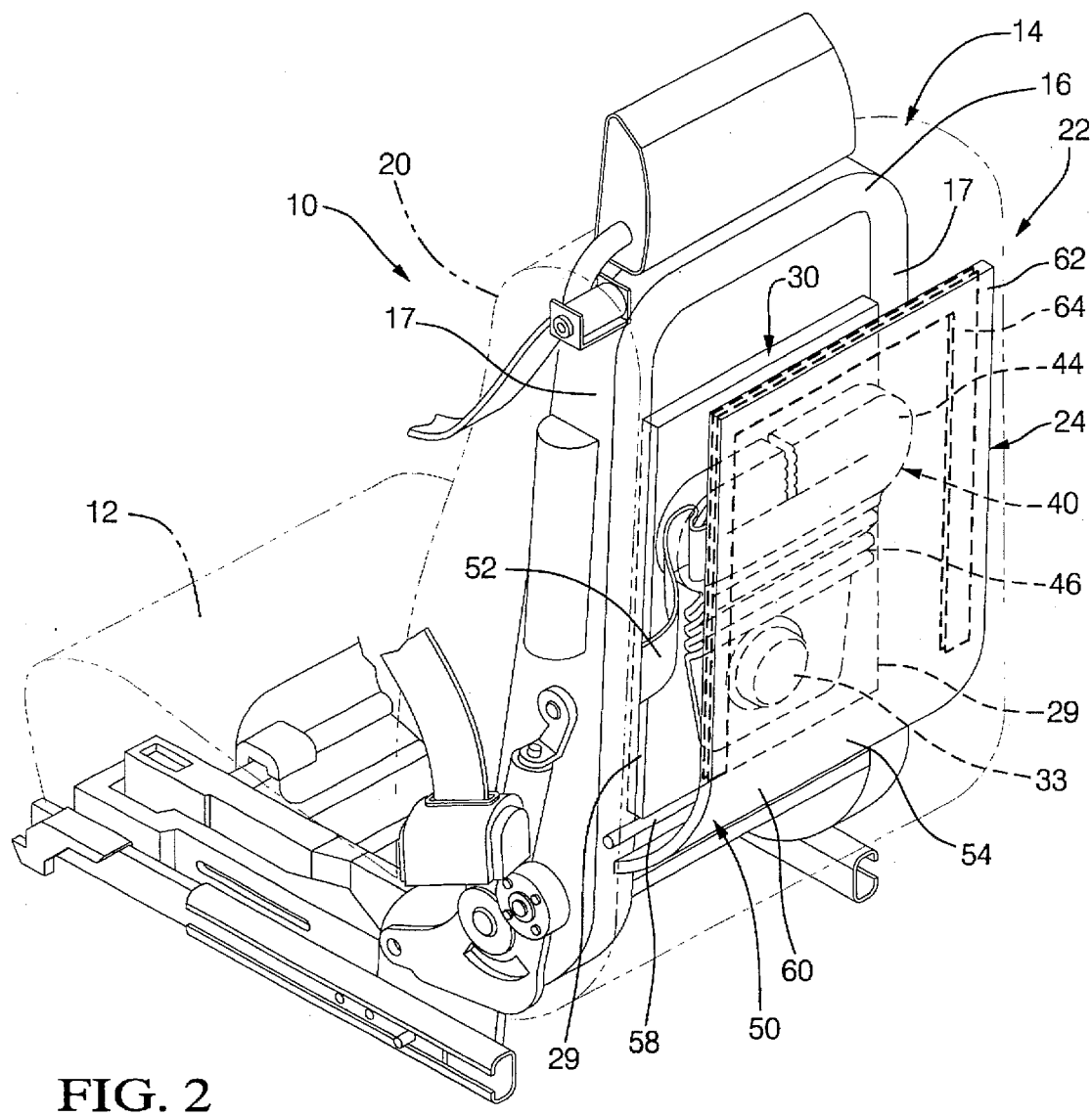
FIG. 2 is a perspective view similar to FIG. 1, but showing the air bag module assembled to the front seat with the air bag module in the undeployed condition and with the seat having a cushion portion shown in phantom lines.

Referring to FIGS. 1 and 2, a front seat 10 for use in a vehicle is shown. The front seat 10 may be used to seat either a driver's side or passenger side front occupant 11. The seat 10 includes a seat bottom 12 and an upper seat back 14. The seat back 14 includes a rigid seat frame 16, preferably being metal, and encompassed within a decorative outer cushion portion 20, preferably comprised of foam material covered by fabric seat material. The seat frame 16 of the upper seat back 14 preferably includes spaced apart upstanding side rails 17. The front seat 10 preferably includes a rearwardly facing seat aperture 18 formed in the outer cushion portion 20 and extending generally between the side rails 17 of the seat frame 16.

An air bag restraint system 22 is provided for restraining a rear seat occupant 34 seated in a rear seat 26 located rearward of the front seat 10. The air bag restraint system 22 is especially useful for restraining the rear seat occupant 34 in frontal collisions. The rear seat occupant 34 includes a upper head portion 35 and a lower knee portion 36 all of which may advantageously be restrained by the air bag restraint system 22, as described further hereinafter.

The air bag restraint system 22 includes the front seat 10 and an air bag module 24 attached to the front seat 10. More specifically, the air bag restraint system 22 includes the front seat 10 with the air bag module 24 inserted within the rearwardly facing seat aperture 18 of the front seat 10 and attached to the side rails 17 of the seat frame 16, as described further hereinafter.

The air bag module 24 generally includes the component parts of a reaction plate 30, an inflator 33, an air bag 40, and a deployment door 50. As best shown in FIG. 1, the reaction plate 30 is preferably a generally rectangular planar plate made of a sturdy rigid material, such as metal. The reaction plate 30 is preferably sized to fit within the rearwardly facing seat aperture 18 and is sized for extending between the side rails 17 of the seat frame 16. Opposing lateral edges 29 of the reaction plate 30 each preferably include forwardly extending mounting brackets 31 for attachment of the reaction plate 30 to the side rails 17 of the front seat 10. The mounting brackets 31 each preferably include bracket apertures 32 for alignment and attachment with side rail apertures 19 via fasteners, such as bolts (not shown).

The inflator 33 may be of any conventional construction which contains chemicals for igniting to generate gas for discharge upon sensing certain vehicle conditions, such as a predetermined amount of longitudinal deceleration. The inflator 33 is secured to the reaction plate 30 and discharges inflator gas in a generally rearward direction for inflating the air bag 40. Preferably, the inflator 33 is mounted towards the lower end of the reaction plate 30 to minimize the moment of the load applied to the seat back 14 during inflation.

As best shown in FIG. 1, the air bag 40 is preferably made of an air bag fabric material which is suitable for inflatable air bag construction. As best shown in the inflated condition in FIG. 3, the air bag 40 includes a forward face 41 positioned adjacent the reaction plate 30 and the front seat 10, and an opposite rearward face 42 positioned adjacent the deployment door 50 and the rear seat occupant 34. The air bag 40 preferably has a mouth portion secured to the reaction plate 30 and inflator 33 and in fluid communication with the inflator 33 for receiving inflator gas therein to inflate the air bag 40.

Figure 4:
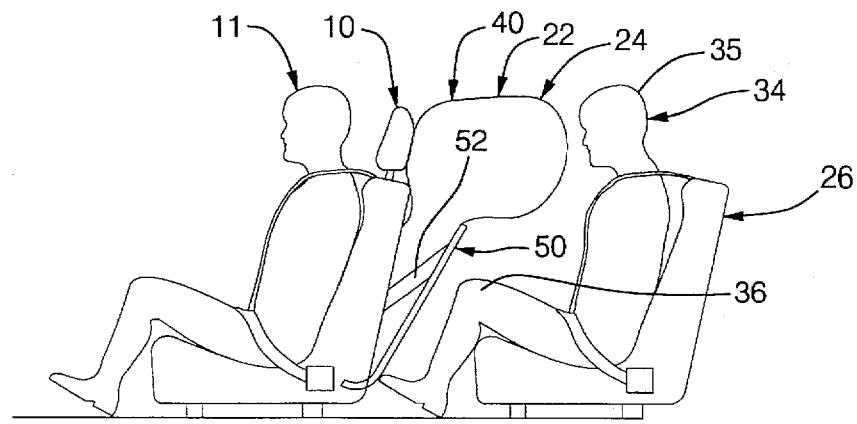
FIG. 4 is a schematic view of the restraint system with the air bag in the inflated condition and showing front and rear seat occupants.
Figure 3:
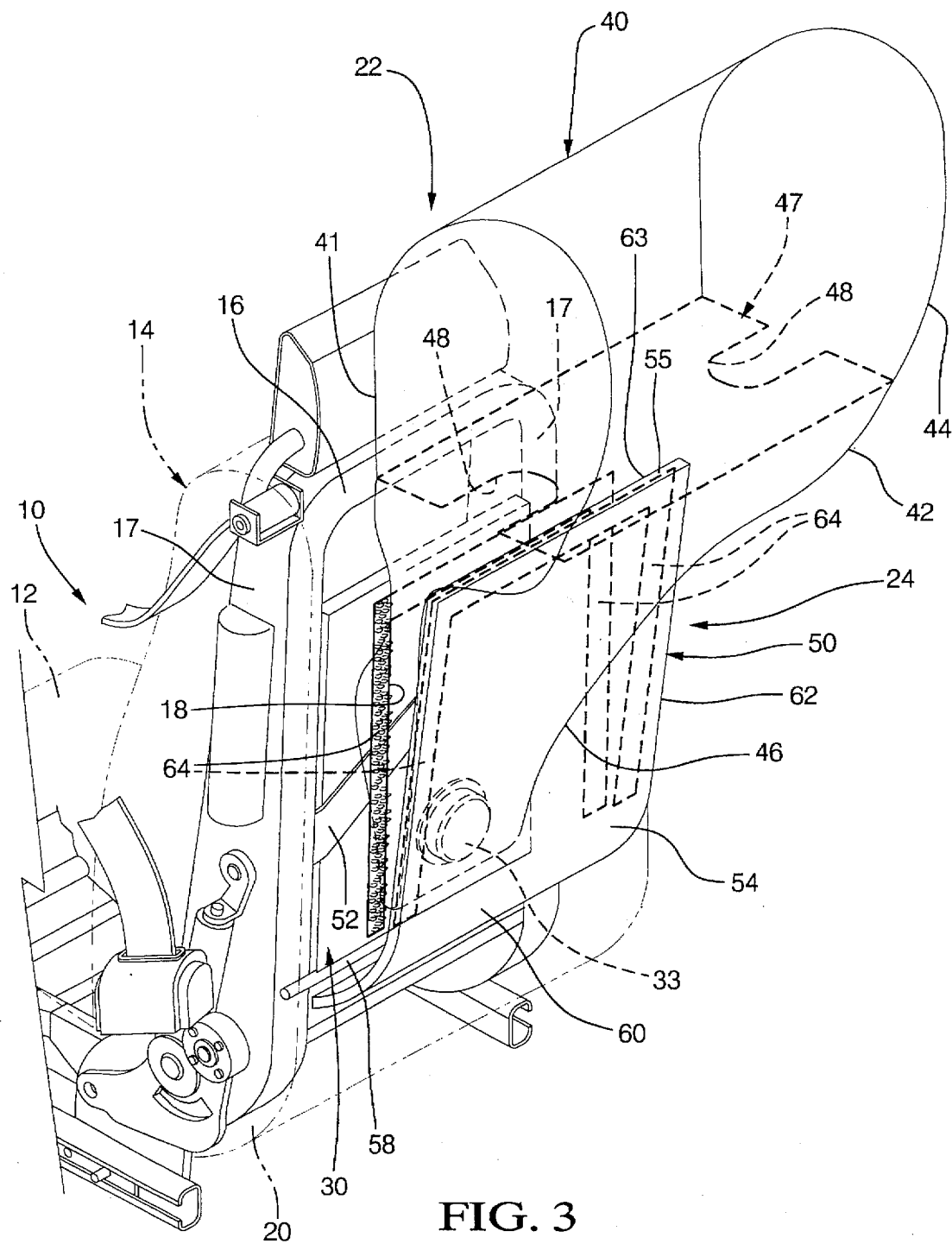
FIG. 3 is a perspective view similar to FIG. 2, but showing the air bag module in the deployed condition with the air bag in the inflated condition.

The air bag 40 includes an upper bag portion 44 generally aligned for protection of the upper head portion 35 of the occupant 34 and a lower bag portion 46 generally aligned for protection of the lower knee portion 36 of the occupant 34. The lower bag portion 46 of the air bag 40 has a generally quadrangular shape and is sized and shaped to essentially fill the space between the reaction plate 30 and the deployment door 50 when the air bag 40 is inflated. The lower bag portion 46 has a narrow longitudinal width at a lower end and has a wider longitudinal width at an upper end such that the lower bag portion 46 has a generally triangular-shaped cross-section shaped to fill the space between the reaction plate 30 and the pivoted deployment door 50. As shown in FIGS. 3 and 4, the lower portion 46 of the air bag 40 and the deployment door 50 cooperatively provide a knee bolster or knee restraint for protection of the lower knee portion 36 of the occupant 34.

As best shown in FIGS. 3 and 4 in the inflated condition, the upper bag portion 44 of the air bag 40 extends above the deployment door 50 and also rearwardly of the deployment door 50 when inflated for protection of the upper head portion 35 of the occupant 34. The upper bag portion 44 preferably has a generally cylindrical shape having a laterally extending axial axis. Advantageously, the cylindrical-shaped upper portion 44 preferably extends laterally outward from the deployment door 50 and is preferably wider than both the lower bag portion 46 and the deployment door 50 for additional protection of the occupant 34.

As best shown in FIG. 3, the upper bag portion 44 of the air bag 40 includes a flexible tether 47 extending between the forward face 41 and the rearward face 42. The tether 47 advantageously helps to shape the upper bag portion 44 and to limit the amount of rearward inflation of the upper bag portion 44. Preferably, the tether 47 is generally 1-shaped to include opposing side openings for permitting the inflator gas to flow through the upper bag portion 44.

The upper and lower bag portions 44, 46 of the air bag 40 are preferably integrally formed from the same sheet or sheets of fabric material and are in fluid communication with each other such that inflator gas may pass therebetween. The mouth portion of the air bag 4.0 may be included at any appropriate location on the air bag 40 for being it fluid communication with the inflator 33 and for receiving inflator gas therein to inflate the air bag 40, but is preferably located on the lower bag portion 46 adjacent the reaction plate 30.

The module 24 also includes a deployment door 50 movably secured to the reaction plate 30 for movement in the rearward direction. The deployment door 50 is preferably movably secured to the reaction plate 30 by a pair of flexible straps 52, each having one end attached to the reaction plate 30 and having another end attached to the deployment door 50. The straps 52 limit the amount of rearward movement of the deployment door 50 during air bag inflation as best shown in FIG. 3. The deployment door 50 is preferably made of a plastic material and advantageously is sized for closing the rearwardly facing seat aperture 18 of the front seat 10. Thus, the deployment door 50 also advantageously serves as the back trim panel for the front seat 10 for closing the seat aperture 18 to complete the front seat 10. The deployment door 50 has a rearward surface 54 for engaging the lower knee portion 36 of the occupant 34 upon air bag inflation and an opposite forward surface 55 for engaging the rearward face 42 of the air bag 40 to provide knee protection for the rear seat occupant 34 during a frontal collision.

Preferably, the deployment door 50 includes a lower door portion 60 which is pivotally secured to the front seat 10 and an upper door portion 62 which is releasably secured to the cushion portion 20 of the front seat 10. As best shown in FIG. 1, the lower door portion 60 preferably includes a first latching member 57 being a clip and the front seat 10 includes a second latching member 58 being a wire or rod extending between the side rails 17 of the seat frame 16. When the module 2,4 is inserted within the seat aperture 18, the first and second latching members 57, 58 are snapped together to pivotally connect the lower door portion 60 to the from seat 10.

Referring to FIGS. 2 and 3, the upper door portion 62 is preferably releasably secured to the cushion portion 20 such that the deployment door 50 can pivot open about the lower door portion 60 upon air bag inflation. Preferably, the upper and side edges of the deployment door 50 and the corresponding edges of the cushion portion 20 surrounding the seat aperture 18 include hook and loop fasteners 64, such as those sold under the trademark name of VELCRO, to releasably secure the upper door portion 62 to the cushion portion 20. Upon air bag inflation as shown in FIG. 3, the air bag 40 forces apart the hook and loop fasteners 64 and an upward opening 63 is formed through which the upper bag portion 44 can deploy. Advantageously, the cushion portion 20 of the front seat 10 is not ripped or torn open by the inflating air bag 40, such that the module 24 can be replaced after deployment, as described further hereinafter.

The module 24 is easily assembled by mounting the inflator 33 and the air bag 40 on the reaction plate 30 such that the inflator 33 is in fluid communication with the air bag 40. The deployment door 50 is movably attached to the reaction plate 30 by straps 52, each having one end attached to the reaction plate 30 and the other end attached to the deployment door 50. The air bag 50 and inflator 33 are each loosely held between the reaction plate 30 and the deployment door 50 by the straps 52. Prior to air bag inflation, the air bag 40 is stored in a folded condition as shown in FIGS. 1 and 2. To fold the air bag 40, the air bag 40 is preferably flattened with the forward and rearward faces 41, 42 lying generally atop each other. Next, the entire air bag 40 is preferably accordion or pleat-type folded from top to bottom. Finally, the outer lateral edges of the upper bag portion 44 are folded up and inwardly towards each other, as shown in FIG. 1. so that the upper bag portion 44 has a lateral width which is not greater than the reaction plate 30. While this preferred fold is shown, it will be appreciated that any suitable fold may be used which compactly folds the air bag 40 to fit between the reaction plate 30 and the deployment door 50. The entire module 24 may be temporarily held together as a unit by wrapping a paper or rubber strap (not shown) around the assembled module 24 which can. simply be cut off immediately prior to installation into the front seat 10.

The completed module 24 is simply inserted into the rearwardly facing seat aperture 18 and the mounting brackets 31 of the reaction plate 30 are secured to the side rails 17 of the front seat 10 to complete the front seat 10 assembly. Advantageously, it will be appreciated that the module 24 can be assembled to the front seat 10 either before or after attachment of the cushion portion 20 to the seat frame 16.

The deployment door 50, which is movably secured to the reaction plate 30 of the module 24, is then also releasably secured to the cushion portion 20 of the seat 10 by simply pushing together the hook and loop fasteners 64 to couple the module 24 to the front seat 10 and to close the seat aperture 18. The first and second latching members 57, 58 on the deployment door 50 and seat 10, respectively, are snapped together to pivotally connect the lower door portion 60 to the seat 10.

However, it will be appreciated that the lower door portion 60 need not necessarily be pivotally connected to the front seat 10, but may be releasably secured to the front seat 10 with hook and loop fasteners such that only the rearward movement is limited by the straps 52 or alternatively the deployment door 50 could be pivotally connected to the reaction plate 30.

Thus, it will be appreciated that the module 24 may be assembled as a unit separate and independent from the front seat 10 and then added as the last component to the front seat 10 to close the seat aperture 18 and complete the front seat 10 assembly. Also advantageously, the deployment door 50 is releasable from the cushion portion 20 of the front seat 10 such that the front seat 10 is not damaged during air bag inflation and the entire module 24 can simply be taken out and replaced.

Upon the sensing of certain predetermined conditions, the inflator 33 generates inflator gas which is discharged into the lower bag portion 46. The force of the deploying air bag 40 forces the separation of the hook and loop fasteners 64 attaching the upper door portion 62 to the cushion portion 20 such that the deployment door 50 pivots open about the lower door portion 60 to a predetermined position limited by the straps 52, of preferably about 12 degrees of rotation. The upper bag portion 44 deploys out through the upward opening 63 and deploys upwardly and rearwardly of the deployment door 50. Rearward inflation of the upper bag portion 44 is limited by the internal tether 47. When the air bag 40 is in the inflated condition as best shown in FIG. 3, the upper bag portion 44 provides protection for the upper head portion 35 of the occupant 34 and the lower bag portion 46 having the triangular-shaped cross-section substantially fills the space between the reaction plate 30 and the deployment door 50 to provide protection for the lower knee portion 36 of the occupant 34. The upper bag portion 44 has a lateral width greater than that of the lower bag portion 46 and the deployment door 50 such that the upper bag portion 44 deploys laterally outward from the deployment door 50 and provides additional protection to the occupant 34 over a greater lateral width of the vehicle.

With reference to FIG. 4, when the rear seat occupant 34 is seated in the normal seating position during certain frontal collisions in which the air bag 40 is deployed, the rear seat occupant 34 moves towards the restraint system 22 and the lower knee portion 36 of the occupant 34 may engage the rearward surface 55 of the deployment door 50 supported by the lower bag portion 46 to provide protection to the lower knee portion 34. The occupant 34 may also translate forward such that the upper head portion 35 of the occupant 34 may engage the upper bag portion 44 to provide protection for the upper head portion 35 of the occupant 34. Advantageously, only a single inflator 33 and single air bag 40 are required to provide frontal protection to both the upper head portion 35 and the lower knee portion 36 of the occupant 34. Also advantageously, this same inflator 33 which is mounted in the front seat 10 could also be used to inflate an air bag for side impact protection of the front seat occupant 11.

Advantageously, the module 24 is lightweight, compact, and simple to manufacture and assemble since it easily is inserted into the seat aperture 18 of the front seat 10. Also advantageously, the module 24 is easy to service and can easily be replaced as a unit after deployment without replacement of the entire seat 10.

It will be understood that a person skilled in the art may make modifications to the preferred embodiment shown herein within the scope and intent of the claims. For example, although the module 24 is shown as mounted to an individual style front seat 10 for seating a single front occupant 11, it will further be appreciated that the air bag restraint system 22 could also be provided in a bench style front seat 10 that seats two or more front seat occupants 11. In that arrangement, there could be two or more individual modules 24 mounted in one or more rearwardly facing seat apertures 18 or there could be a single centrally located module 24 with the reaction plate 30, deployment door 50 and air bag 40 having greater lateral widths. Although the reaction plate 30 is shown as being bolted to the side rails 17 by the use of mounting brackets 31, it will further be appreciated that the module 24 could also be mounted within the seat aperture 18 by snap-fitted attachment using mating latching members on the reaction plate 30 and the front seat 10 for ease of assembly. For example, the latching members could be clips and rods or other press-fit or interference-fit snap-in fasteners. Although the deployment door 50 is shown as releasably secured to the cushion portion 20 by hook and loop fasteners 64, many other releasably secured fastening devices may be used, such as adhesives which may be pulled apart or double-sided tape or releasable stitching.

While the present invention has been described as carried out in a specific embodiment thereof, it is not intended to be limited thereby but is intended to cover the invention broadly within the scope and spirit of the claims.

What is claimed is:

1. An air bag restraint system for restraining a rear seat occupant having an upper head portion and a lower knee portion, the restraint system comprising:
   a front seat including an upstanding seat frame;
   a reaction plate attached to the seat frame;
   an inflator mounted on the reaction plate, the inflator for discharging inflator gas;
   an air bag mounted on the reaction plate and in fluid communication with the inflator for receiving inflator gas therein to inflate the air bag; and
   a deployment door mounted rearward the reaction plate, inflator and air bag, the deployment door being movably secured to the reaction plate and being releasably secured to the seat, the deployment door being a rearward trim panel for the seat.

2. The restraint system of claim 1 wherein the deployment door has a lower door portion pivotally connected to the seat.

3. The restraint system of claim 1 wherein the deployment door is releasably secured to the seat by hook and loop fasteners.

4. The restraint system of claim 1 wherein the deployment door includes a lower door portion pivotally secured to the seat and an upper door portion releasably secured to the seat.

5. The restraint system of claim 4 wherein flexible straps extend between the reaction plate and the deployment door to limit rearward pivotal movement of the deployment door upon air bag inflation.

6. The restraint system of claim 1 wherein the air bag includes a lower bag portion which substantially fills the space between the reaction plate and the deployment door upon inflation and wherein the air bag includes an upper bag portion which extends upwardly above the deployment door and rearwardly and laterally outward from the deployment door upon inflation and wherein the upper bag portion is positioned for protecting the upper head portion of the occupant upon inflation and wherein the lower bag portion and the deployment door cooperatively provide a knee restraint positioned for protecting the lower knee portion of the occupant upon inflation.

7. The restraint system of claim 6 wherein the upper bag portion of the air bag has a generally cylindrical cross-section and wherein the lower bag portion of the air bag has a generally triangular-shaped cross-section.

8. The restraint system of claim 6 wherein the air bag includes a forward face and a rearward face and wherein the upper bag portion includes an internal tether extending between the forward face and the rearward face and wherein the tether is positioned above the deployment door and limits rearward inflation of the upper bag portion of the air bag upon inflation.

9. The restraint system of claim 1 wherein flexible straps extend between the reaction plate and the deployment door for limiting rearward movement of the deployment door upon air bag inflation.

10. An air bag restraint system for restraining a rear seat occupant having an upper head portion and a lower knee portion, the restraint system comprising:
    a front seat having a cushion portion including a rearwardly facing seat aperture;
    an air bag module for attachment to the seat and for insertion within the seat aperture, the air bag module comprising:
      a reaction plate mounted to the seat;
      a deployment door movably secured to the reaction plate for movement in a rearward direction, the deployment door closing the rearwardly facing seat aperture when the module is assembled to the seat such that the deployment door is a rearward trim panel for the seat;
      an inflator mounted between the reaction plate and the deployment door, the inflator for discharging inflator gas; and
      an air bag mounted between the reaction plate and the deployment door, the air bag in fluid communication with the inflator for receiving inflator gas therein.

11. The restraint system of claim 10 wherein the deployment door is releasably secured to the cushion portion whereby upon air bag inflation the deployment door separates from the cushion portion.

12. The restraint system of claim 10 wherein the deployment door is releasably secured to the cushion portion by hook and loop fasteners.

13. The restraint system of claim 10 wherein the deployment door includes a lower door portion pivotally connected to the seat and an upper door portion releasably secured to the seat.

14. The restraint system of claim 10 wherein the air bag includes a lower bag portion which substantially fills the space between the reaction plate and the deployment door upon inflation and wherein the air bag includes an upper bag portion which extends upwardly above the deployment door and rearwardly and laterally outward of the deployment door upon inflation and wherein the inflated upper bag portion is positioned for protecting the upper head portion of the occupant and wherein the inflated lower bag portion and deployment door cooperatively provide a knee restraint positioned for protecting the lower knee portion of the occupant.

15. An air bag restraint system for restraining a rear seat occupant having an upper head portion and a lower knee portion, the restraint system comprising:

a front seat having an upstanding seat frame including laterally spaced apart sides rails and a cushion portion including a rearwardly facing seat aperture; and an air bag module for mounting within the seat aperture, the module comprising a reaction plate for attachment between the side rails of the seat frame;

a deployment door movably secured to the reaction plate, the deployment door closing the rearwardly facing seat aperture when the module is assembled to the seat such that the deployment door is a rear trim panel for the seat, the deployment door having a lower door portion pivotally secured to the seat and an upper door portion releasably secured, to the cushion portion when the module is assembled to the seat;

an inflator mounted on the reaction plate between the reaction plate and the deployment door, the inflator for discharging inflator gas;

an air bag mounted on the reaction plate between the reaction plate and the deployment door, the air bag in fluid communication with the inflator for receiving inflator gas therein to inflate the air bag, the air bag including a lower bag portion which substantially fills the space between the reaction plate and the deployment door upon inflation and the air bag including an upper bag portion extending upwardly above the deployment door and rearwardly of the deployment door upon inflation such that the inflated upper bag portion is positioned for protecting the upper head portion of the occupant and wherein the inflated lower bag portion and the deployment door cooperatively provide a knee restraint positioned for protecting the lower knee portion of the occupant.

16. The restraint system of claim 15 wherein one of the lower door portion and the seat includes a first latching member and the other of the lower door portion and the seat includes a second latching member and wherein the first and second latching members engage upon attachment of the module to the front seat to pivotally attach the deployment door to the seat.

17. The restraint system of claim 16 wherein one of the latching members is a clip and other is a rod.

18. The restraint system of claim 15 wherein the upper door portion of the deployment door and the cushion portion include matably aligned hook and loop fasteners to releasably secure the upper door portion to the cushion portion.

19. The restraint system of claim 15 wherein the deployment door is movably secured to the reaction plate by flexible straps to limit pivotal movement of the deployment door in the rearward direction upon air bag inflation.

20. The restraint system of claim 15 wherein the upper bag portion of the air bag has a lateral width greater than a lateral width of the lower bag portion of the air bag and a lateral width greater than a lateral width of the deployment door.

21. The restraint system of claim 15 wherein the inflated upper bag portion has a generally cylindrical cross-section and wherein the inflated lower bag portion has a generally triangular cross-section.

22. The restraint system of claim 15 wherein the air bag includes a forward face and a rearward face and wherein the upper bag portion includes an internal tether extending between the forward face and the rearward face and wherein the tether is positioned above the deployment door upon air bag inflation and limits rearward inflation of the upper bag portion.

* * * * *